United States Patent [19]

Esau

[11] Patent Number: 5,528,886
[45] Date of Patent: Jun. 25, 1996

[54] HITCHING ARRANGEMENT FOR A MOWER DECK

[75] Inventor: Merlin L. Esau, Newton, Kans.

[73] Assignee: Moridge Manufacturing, Inc., Moundridge, Kans.

[21] Appl. No.: 353,896

[22] Filed: Dec. 12, 1994

[51] Int. Cl.$^6$ .................................. A01D 34/82
[52] U.S. Cl. ............... 56/14.9; 56/15.6; 56/DIG. 14; 280/455.1; 280/474; 280/475
[58] Field of Search .................... 56/15.1, 15.2, 56/14.9, 15.5, 15.7, 15.9, 17.1, 17.2, DIG. 14, 15.6; 280/455.1, 474, 475, 507, 460.1; 403/325, 322, 321

[56] References Cited

U.S. PATENT DOCUMENTS

| | | | |
|---|---|---|---|
| 2,689,440 | 9/1954 | Schroeppel | 56/15.7 |
| 2,851,250 | 9/1958 | Hansen | 280/475 |
| 4,162,606 | 7/1979 | Weichel | 56/15.9 |
| 4,266,795 | 5/1981 | Walker | 280/460.1 |
| 4,525,987 | 7/1985 | Werner et al. | 56/15.2 |
| 5,079,926 | 1/1992 | Nicol | 56/15.5 |
| 5,111,603 | 5/1992 | Knowlton et al. | 280/460.1 |
| 5,332,250 | 7/1994 | Thornwall et al. | 280/507 |

FOREIGN PATENT DOCUMENTS

| | | | |
|---|---|---|---|
| 1231119 | 12/1966 | Germany | 280/460.1 |
| 1491989 | 7/1989 | U.S.S.R. | 280/507 |

OTHER PUBLICATIONS

Operator's Manual & Parts List for GRASSHOPPER Down Discharge Mulching Mower, Models 9244, 9252, 9261, publication date Jun. 1993.

Operator's Manual & Parts List for GRASSHOPPER Mower Deck, Model 6372 and 9272, publication date Jun. 1993.

Operator's Manual & Parts List for GRASSHOPPER Riding Mower, Model 411 and 411R, publication date Sept. 1991.

*Primary Examiner*—Terry Lee Melius
*Assistant Examiner*—Heather Chun Shackelford

[57] ABSTRACT

A hitching arrangement for attaching a mower deck to a propelling vehicle has a lift shaft rotatably supported by the mower deck and extending transversely across the deck. At least one hitch arm is fixedly secured on one end to the lift shaft. The hitch arm has a hook located on its other end with a downwardly facing opening adopted for engagement with a generally horizontally disposed attaching member on the propelling vehicle. A cutting height adjustment mechanism is operably coupled to the lift shaft and adjusts the cutting height of the mower. The adjustment mechanism has a first position corresponding to an elevated cutting height of the mower deck and a second position corresponding to a lowered cutting height of the deck. A deck stand is provided which is releasably attached to the deck. When the deck stand is attached to the deck, movement of the adjustment mechanism toward its second position causes the hitch arm to be swung upwardly to disengage the hook from the attaching member, and movement of the adjustment mechanism toward its first position causes the hitch arm to be swung downwardly for engaging the hook with the attaching member.

7 Claims, 2 Drawing Sheets

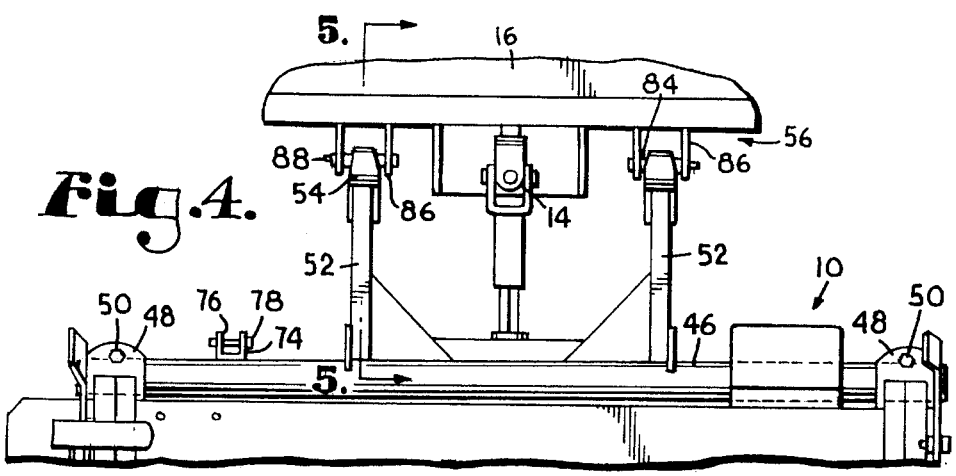
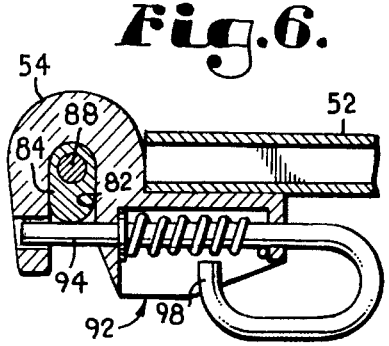
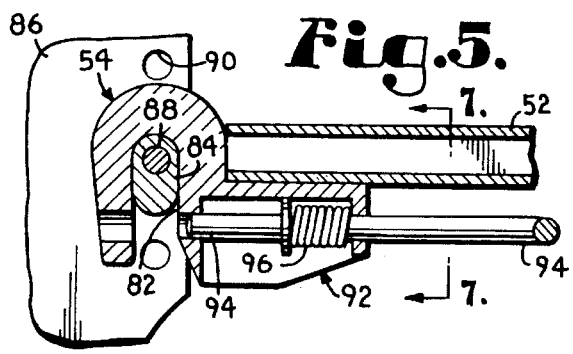
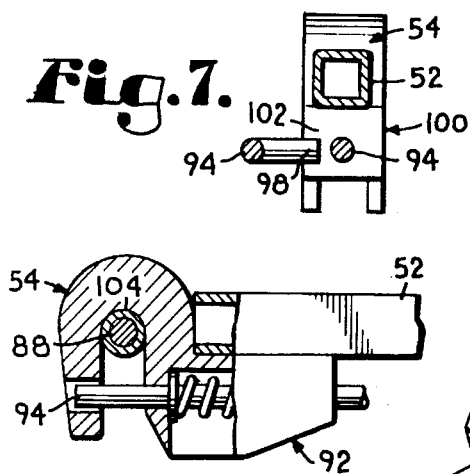
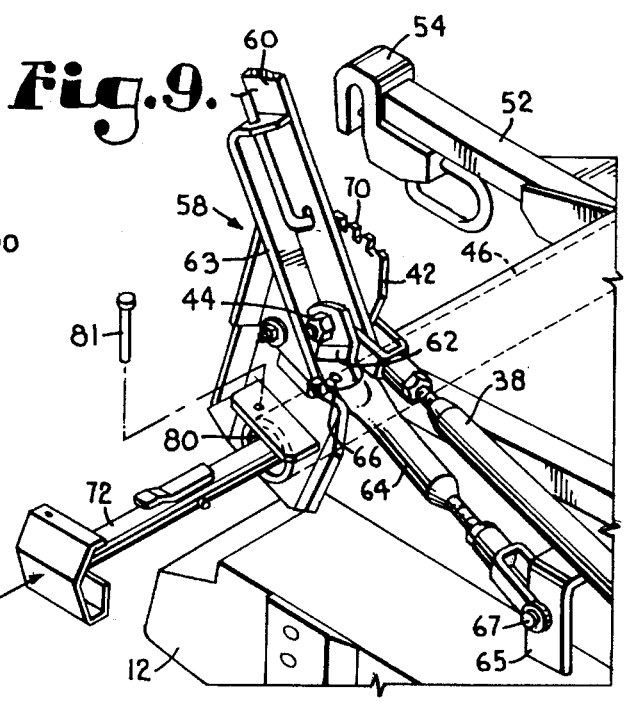

HITCHING ARRANGEMENT FOR A MOWER DECK

This invention relates to a hitching arrangement for connecting and disconnecting a mower deck to and from a propelling vehicle.

Tractors or dedicated lawn care vehicles are often fitted with mowing decks to allow the tractor or vehicle to perform a grass or vegetation cutting function. These mowing decks typically have a plurality of cutting blades rotatably mounted to a deck housing. The cutting blades serve to cut the growing grass in a swath as the tractor with the attached deck moves along the ground. The deck and attached cutting blades are vertically adjustable by an adjusting mechanism to obtain the desired cutting depth. The cutting blades are normally linked together via a driving arrangement of spindles and belts or chains. Power is supplied to the driving arrangement of the deck by the tractor via a power takeoff or some other drive belt or drive chain arrangement.

A lawn mower operator needs the capability of hitching and unhitching the mower deck to and from the vehicle used to propel the mower deck. Removal of the deck allows the operator to perform maintenance on the deck that would not be possible when the deck is attached to the vehicle. Further, an operator may wish to interchange different types of mowing decks or exchange the mowing deck with a different utility implement, for example, a snow blower or snow blade.

In the past, the hitching and unhitching of a mower deck often required the vertical alignment of apertures in a hitch structure of the propelling vehicle with apertures in a hitch arm of the mower deck, and thereafter, the positioning of a pin within these aligned apertures. This operation required a relatively large amount of operator skill and effort to make the connection. The effort which was needed was multiplied if the deck had more than one hitch arm, requiring the alignment of a plurality of apertures and installation of multiple pins.

Other prior art mower decks use hitch arm or arms with downwardly facing hooks. The hooks connect with a horizontally disposed member on the propelling vehicle. The hitch arms of this type of structure, however, are not pivotal with respect to the mower deck and thus often require the operator to manually lift, align and move the deck in order to connect it to the hitch structure of the propelling vehicle.

Additionally, some prior art mower deck hitching arrangements have rigid connections between the deck and the propelling vehicle so that the deck is not allowed to tilt laterally with respect to the vehicle. Such mower decks often cannot conform to the uneven and undulating surfaces over which they operated. On the other hand, other mower decks do provide for lateral movement or tilting of the mower deck with respect to the vehicle in order for the deck to conform to the surface traversed. In some instances such mowers have rigid connections between the mower deck and the propelling vehicle, and in other instances the arrangements allow tilting between the deck and the propelling vehicle. However, prior art hitching arrangements have not allowed switching between a rigid connection and tilting connection. Instead, such arrangements are dedicated to one type of connection or the other.

Thus, a hitching arrangement for a mower deck is needed which allows easy and efficient connecting and disconnecting of the deck to and from a propelling vehicle. Further, a hitching arrangement is needed which will allow the operator versatility in choosing between a rigid connection of the deck to the propelling vehicle and a tilting connection which allows the deck to move or be tilted with respect to the propelling vehicle to conform to an uneven mowing surface.

Accordingly, it is the primary object of the present invention to provide a hitching arrangement for attaching a mower deck to a propelling vehicle which is constructed to use the cutting height adjustment mechanism of the mower deck in conjunction with a removable deck stand to allow easy and efficient hitching and unhitching of the mower deck.

Another important object of this invention is to provide a hitching arrangement which utilizes pivoting hitch arms with downwardly facing hooks disposed on their ends, the hooks engaging horizontally disposed attaching bushings of the propelling vehicle and pivoting in response to movement of the cutting height adjustment mechanism.

A further object of this invention is to provide a hitching arrangement construction utilizing interchangeable attaching bushings having different shapes in conjunction with hitch arms so that use of generally oblong-shaped bushings substantially prevents lateral tilting of the mower deck with respect to the propelling vehicle and use of generally circular-shaped bushings allows lateral tilting of the deck with respect to the propelling vehicle.

These and other important aims and objects of the present invention will be further described, or will become apparent from the following description and explanation of the drawings, wherein:

FIG. 4 is an enlarged detailed sectional view taken generally along line 4—4 of FIG. 3 and showing the mower deck attached to the propelling vehicle with the deck stand removed from its attaching bracket;

FIG. 5 is a fragmentary, enlarged detailed cross-sectional view taken generally along line 5—5 of FIG. 4 and showing the latch pin mechanism in its open position;

FIG. 6 is a view similar to FIG. 5, but showing the latch pin mechanism in its closed position;

FIG. 7 is a detailed, cross-sectional view taken generally along line 7—7 of FIG. 5;

FIG. 8 is a cross-sectional view similar to FIG. 6, but showing the use of an alternate attaching bushing; and FIG. 9 is a fragmentary, enlarged top perspective view of a portion of the cutting height adjusting assembly and showing the storage position of the deck stand.

Figure 1:
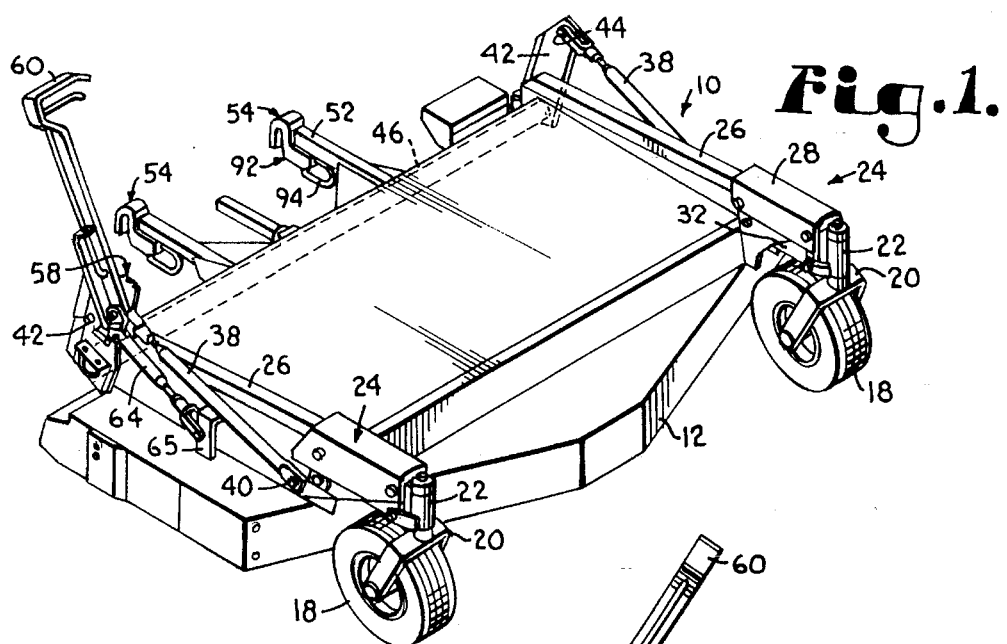
FIG. 1 is a top perspective view of a mower deck having a hitching arrangement embodying the principles of this invention.

A mower deck with a hitching arrangement embodying the principles of this invention is broadly designated in the drawings by the reference numeral 10. Deck 10 has housing 12 which contains the cutting blades (not shown) and the drive arrangement for the cutting blades. As shown in FIG. 4, the cutting blades are driven through power takeoff 14 of lawn care vehicle or tractor 16.

Figure 2:
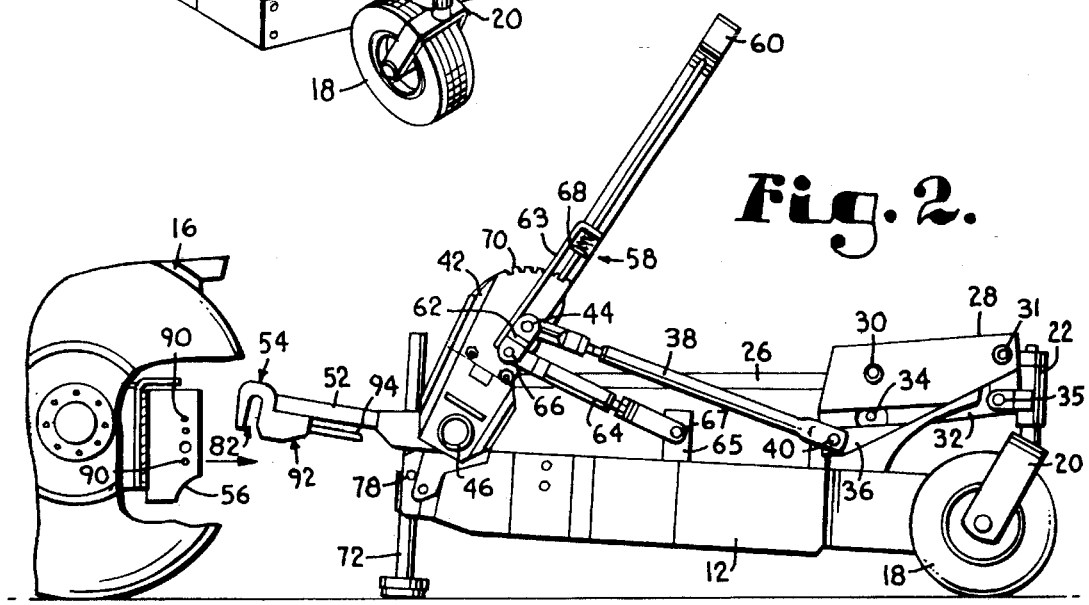
FIG. 2 is a side elevational view of the mower deck of FIG. 1 showing the hitch arms in their upper pivotal position prior to the connection of the arms to the hitch structure of the propelling vehicle, parts being broken away to reveal details of construction and the deck stand shown in its attached position.
Figure 3:
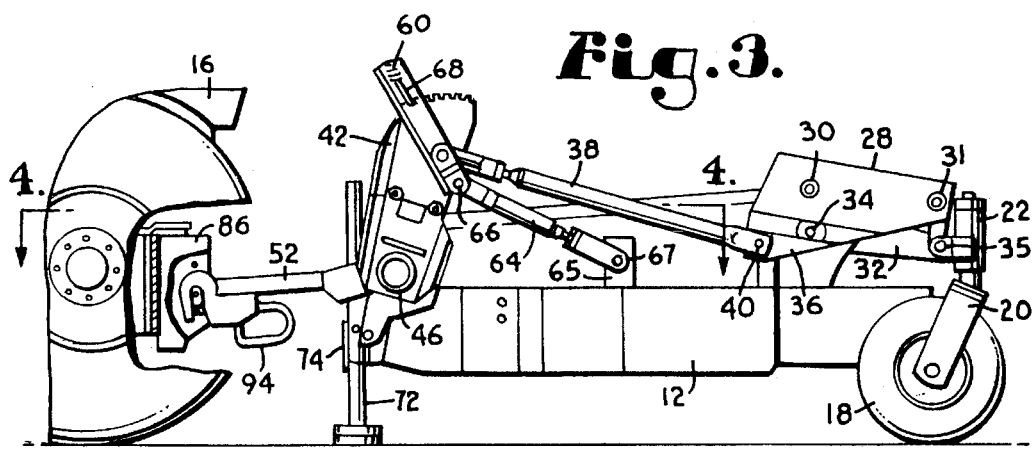
FIG. 3 is a side elevational view similar to FIG. 2 showing the hitch arms in their lower pivotal positions and connected to the hitch structure of the propelling vehicle, parts being broken away to reveal details of construction.

Housing 12 has caster wheels 18 mounted on opposite sides at its forward end, the direction of travel of the deck being shown by the arrow in FIG. 3. Wheels 18 are rotatably supported by forks 20 which in turn are connected to pivot assemblies 22. Pivot assemblies 22 are connected by parallel linkages 24 to support members 26 extending upwardly from and rigidly connected to the upper surface of housing 12. Each linkage 24 has an upper, rigid channel link 28 which is pivotally secured at one end to support member 26 at pivot point 30 and pivotally secured at its other end to assembly 22 at pivot point 31. Each linkage 24 also has lower link 32 which is disposed below and completely separate from member 28. Each lower member 32 is pivotally connected at one end to supporting member 26 at pivot point 34 and pivotally connected at its other end to assembly 22 at pivot point 35. Thus, linkage 24 allows wheels 18 to be pivoted vertically with respect to the deck between a raised position shown in FIG. 2 corresponding to a low cutting height for the front portion of deck 10 and a lowered position shown in FIG. 3 corresponding to a high cutting height for the front portion of deck 10.

Each channel member 28 has a downwardly extending connecting flange 36. Flanges 36 are pivotally connected to the ends of corresponding, rigid linkage arms 38 at pivot points 40. The other ends of arms 38 are each pivotally connected to their corresponding one of a pair of actuating members 42 by a bolt 44. Each member 42 is fixedly secured to its respective opposite end of a lift shaft 46 extending transversely across the rear end of the deck. Shaft 46 is pivotally connected to the deck by U-shaped receiving members 48. With reference to FIG. 4, the upper portions of members 48 are shown. Each member 48 curves downwardly from its upper portion to a lower portion (not shown) to form a U-shaped receiving aperture. The open end of each U-shaped aperture faces toward tractor 16. Shaft 46 is held in the U-shaped apertures of members 48 by bolts 50.

Hitch arms 52 are fixedly secured to the periphery of shaft 46 as shown in FIGS. 1–4, and project rearwardly radially from the shaft. Each arm 52 has a hook 54 disposed on its distal end for engagement with hitch structure 56 of vehicle 16, as will be more fully described below.

With reference to FIGS. 1–3 and 9, the actuating member 42 located on the left side of FIG. 1 has height adjusting assembly 58 connected thereto. Assembly 58 has lift lever 60 pivotally secured to actuating member 42 by the same bolt 44 used to pivotally secure arm 38 thereto, as best shown in FIG. 9. Further, a longitudinally offset clevis forming member 62 is secured along one of its edges to flange 63 of lever 60 by, for example, welding. The upper portion of member 62 forms a clevis with lever 60 for receiving an end of arm 38. The lower end of member 62 forms a clevis with lever 60 for receiving an end of rigid linkage arm 64. Arm 64 is pivotally secured in the lower clevis at pivot point 66. The other end of arm 64 is pivotally secured to rigid mounting flange 65 at pivot point 67. Flange 65 is rigidly secured to the top surface of housing 12. Lever 60 further has a spring biased locking mechanism 68 which engages a toothed edge 70 of actuating member 42 to secure or hold deck 10 at a particular cutting height.

With reference to FIGS. 2 and 3, removable deck stand 72 is used only during the hitching and unhitching operations of deck 10. FIGS. 2 and 3 show stand 72 in its attached position. Stand 72 is attached to deck 10 via an attaching bracket 74. Bracket 74 has a channel 76 for receiving stand 72 as best shown in FIG. 4. Bracket 74 has a plurality of vertically stacked adjusting apertures for adjustable alignment with a transversely extending aperture (not shown) in stand 72. Stand 72 is secured to bracket 74 by aligning the appropriate apertures of bracket 74 with the aperture in deck stand 72 and placing pin 78 in position. FIG. 4 shows bracket 74 without stand 72 received therein and with pin 78 in its stowed position.

When stand 72 is not being used, it is stowed in storage chamber 80 formed axially within shaft 46, as shown in FIG. 9. Stand 72 is held in its stowed position by pin 81.

With reference to FIGS. 5–7, hooks 54 have downwardly facing openings 82 which receive oblong-shaped attaching bushings 84 of hitch structure 56. Bushings 84 are preferably made of nylon, but can be made of any other suitable material. Each bushing 84 is generally horizontally disposed between a pair of hitch brackets 86 and is held in this horizontal position by adjusting pin 88 which extends through the body of bushing 84. The vertical height of bushings 84 can be adjusted by using any of the apertures 90 in brackets 86.

Hooks 54 have latch pin mechanisms 92 for securing the hooks about bushings 84. Mechanisms 92 have latch pins 94 which are biased by springs 96 toward a closed or locked position as shown in FIG. 6. To move mechanism 92 to its open position, pin 94 is moved to the right in the figures, thus compressing spring 96. As portion 98 of pin 94 clears mechanism casing 100, pin 94 is pivoted 90 degrees upwardly so that portion 98 rests on the outside surface 102 of casing 100, as best shown in FIGS. 5 and 7. Mechanism 92 can be returned to its closed locked position by rotating pin 94 downwardly and allowing the bias of spring 96 to move pin 94 to the left in the figures.

When mechanism 92 is in its closed position, as shown in FIG. 6, it forms a generally oblong enclosure in conjunction with opening 82. Bushing 84 has a generally oblong shape to substantially fill this oblong enclosure. This construction wherein the oblong enclosure is completely filled by oblong bushing 84 results in a substantially rigid connection between hitch structure 56 and deck 10 so that side-to-side tilting of the deck with respect to vehicle 16 is substantially prevented. That is, because the oblong enclosures of each hook 54 are completely filled with oblong bushings 84 so that there is little or no "play" or "drift" in the hitching structure, deck 10 is not allowed to laterally tilt or rock with respect to vehicle 16.

With reference to FIGS. 2 and 3, the hitching of deck 10 to vehicle 16 will be described. Hitch structure 56 of vehicle 16 is located on the front of the vehicle so that deck 10 is positioned in front of the vehicle after it has been connected. As shown in FIG. 2, deck 10 is in a storage position wherein stand 72 is disposed in bracket 74 and supports the rear portion of the deck. Further, lever 60 is in its most forward position so that wheels 18 are completely raised and the forward portion of housing 12 is at its lowest possible cutting depth. In this position, arms 52 are generally angled upwardly and pivotally raised. Further, latch pin mechanisms 92 are in their locked open positions, as shown in FIG. 5. In this storage position, vehicle 16 is driven toward deck 10 as indicated by the arrow in FIG. 2, so that hitch arms 52 are aligned with their respective attaching bushings 84.

After hooks 54 of arms 52 are aligned above bushings 84, lever 60 is moved rearwardly as shown in FIG. 3 so that hitch arms 52 are pivoted downwardly and openings 82 receive bushings 84. More particularly, the rearward movement of lever 60 pivots lever 60 about pivot point 66, thus moving linkage arms 38 and actuating member 42 rearwardly as shown in FIG. 3. The rearward movement of arms 38 results in wheels 18 obtaining their lowered positions so that the forward portion of housing 12 attains its highest cutting height. Further, the rearward movement of members 42 results in pivoting of shaft 46 so that hitch arms 52 are pivoted downwardly to allow openings 82 to receive bushings 84. After openings 82 in hooks 54 have received bushings 84, pins 94 are rotated downwardly 90 degrees so that springs 96 can force mechanisms 92 into their closed, locked positions. Deck stand 72 can then be removed by removing pin 78. Stand 72 is then put in storage chamber 80 and secured therein by pin 81.

With reference to FIG. 3, once deck 10 is attached to vehicle 16, the height of housing 12 of the deck is adjusted by manipulating lever 60. More particularly, as lever 60 is moved forwardly, as shown in FIG. 2, the front portion of housing 12 will be lowered as a result of linkage arms 38 manipulating parallel linkages 24 to raise wheels 18. Further, forward movement of lever 60 results in a rotational force being applied to shaft 46, this force attempting to pivot hitch arms 52 upwardly. However, because arms 52 are secured at a vertical location by bushings 84, the rotational force results in the lowering of the rear portion of housing 12. Downward motion of the rear portion of housing 12 is allowed because deck stand 72 is not present, but is in its stowed position when deck 10 is operating.

With reference to FIG. 3, housing 12 is raised to a particular cutting height by moving lever 60 rearwardly. Rearward movement of lever 60 results in pivoting about point 66 so that arms 38 manipulate linkages 24 to raise the front portion of housing 12. Further, the rearward movement of lever 60 results in a rotational force being applied to shaft 46, this force attempting to pivot hitch arms 52 downwardly. Because arms 52 are vertically fixed by bushings 84, rearward movement of lever 60 results in the rear portion of housing 12 being raised to a higher cutting position. Spring biased locking mechanism 68 allows lever 60 to be locked at a variety of different positions between the two extremes shown in FIGS. 2 and 3, to thus provide adjustment of the cutting height of housing 12.

To remove deck 10 from vehicle 16, lever 60 is moved to its most rearward position as shown in FIG. 3. This position corresponds to the uppermost cutting height of housing 12. After the deck is in this position, stand 72 is removed from storage chamber 80 and attached to bracket 74 by pin 78 so that the lower end of stand 72 engages the ground. After stand 72 is secured in place, latch pins 94 are manipulated to their open position as shown in FIG. 5 and described above. Thereafter, lever 60 is moved forwardly as shown in FIG. 2, thus resulting in the upward pivotal movement of hitch arms 52. This movement results in hooks 54 being disengaged from bushings 84. The vehicle can then be backed away from the deck which is now in its storage position. As is apparent, the hitching and unhitching operations also require the connection and disengagement of power takeoff 14 to the drive mechanisms of the deck.

Alternative attaching bushings 104 are shown in FIG. 8. Bushings 104 are generally circular in cross section so that they do not fill the entire enclosure formed by openings 82 and latch pin mechanisms 92, as do bushings 84. This alternative bushing construction allows bushings 104 to drift up and down within the enclosures so that deck 10 can be laterally tilted or rocked side-to-side with respect to vehicle 16. This "floating" arrangement allows deck 10 to conform with uneven and undulating surfaces over which the deck is propelled. When desired, bushings 104 can be simply interchanged with bushings 84 by removing pins 88 from the apertures in brackets 86, and thereafter, sliding bushings 84 out of position. The aperture within bushings 104 can then be aligned with the desired apertures in hitch brackets 86 and pin 88 reinserted to maintain bushings 104 in their generally horizontal position.

Although the hitching arrangement of the present invention is described with respect to a mower deck, this arrangement can work equally as well with other utility implements, for instance, snow blowing or blading implements.

Thus, the present invention provides for an easy and efficient hitching and unhitching arrangement which utilizes the raising and lowering mechanism of the mower deck. Further, this invention allows an operator to change the connection of the deck to the vehicle between a substantially rigid configuration wherein the deck will not tilt with respect to the vehicle and a "floating" arrangement which allows tilting with respect to the vehicle to conform to undulations on the ground surface.

Having described the invention, what is claimed is:

1. A hitching arrangement for attaching a mower deck to a propelling vehicle, the hitching arrangement utilizing the cutting height adjustment mechanism of the mower deck to facilitate the hitching operations, the hitching arrangement comprising:

a lift shaft rotatably supported by the mower deck and extending transversely across the deck;

at least one hitch arm fixedly secured on one end to said lift shaft, said hitch arm having a hook located on its other end, said hook having a downwardly facing opening adapted for engagement with a generally horizontally disposed attaching member on the propelling vehicle;

cutting height adjustment means operably coupled to said lift shaft, for manually adjusting the cutting height of the mower deck by rotating the lift shaft to swing the lift arm, said adjustment means having a first position corresponding to an elevated cutting position for the deck and a second position corresponding to a lowered cutting position for the deck; and a deck stand releasably attached to said mower deck for supporting the latter at a predetermined height;

wherein movement of said adjustment means toward said second position with said stand attached to the deck causes said hitch arm to be swung upwardly to disengage the hook from the attaching member, and movement of said adjustment means toward said first position causes said hitch arm to be swung downwardly for engaging said hook with the attaching member;

wherein said hook of said hitch arm has latch pin means carried thereby for securing said hook to said attaching member, said attaching member including a bushing adapted to be engaged by said hook, said latch pin means having an open position and a closed position, said open position allowing said opening of said hook to receive the attaching bushing and said closed position securing the attaching bushing within said opening of said hook; and wherein said opening of said hook and said latch pin means form an oblong enclosure when said latch pin means is in its closed position and wherein the attaching member includes an oblong-shaped bushing adapted to be engaged by the hook so that, when the bushing is received in said opening and said latch means is in its closed position, said oblong enclosure is substantially filled by the attaching bushing.

2. The hitching arrangement of claim 1 wherein said latch pin means includes a spring which biases said latch pin means to its closed position.

3. The hitching arrangement of claim 1 wherein said lift shaft has a storage chamber for said deck stand when said deck stand is not attached to said deck for the hitching operation.

4. The hitching arrangement of claim 1 wherein said deck stand is attached to said deck by an attaching bracket, said bracket having a plurality of apertures formed therein, said apertures aligning with an aperture in said deck stand and for receiving a pin for securing said deck stand at a desired location.

5. The hitching arrangement of claim 1, further comprising a second hitch arm fixedly secured on one end to said lift shaft, said second hitch arm having a second hook located on its other end, said second hook having a downwardly facing opening for engagement with a second generally horizontally disposed attaching bushing of the hitch structure of the propelling vehicle.

6. A hitching arrangement for attaching a mower deck to the hitch structure of a propelling vehicle, the hitching arrangement comprising:

a pair of generally horizontally disposed attaching bushings secured to the hitch structure of the propelling vehicle;

a pair of hitch arms secured to the deck, each said hitch arms having a hook located on one of its ends, each said hook having a downwardly facing opening for engagement with one of said attaching bushings;

latch pin means associated with each hook for securing said hooks around said attaching bushings, each said latch pin means having an open position and a closed position, said open position allowing said opening of said respective hook to receive said respective attaching bushing of the hitch structure and said closed position securing said respective attaching bushing within said opening, each said opening and its respective latch pin means forming an oblong enclosure when said latch pin means is in its closed position; and wherein said attaching bushings include bushings having a generally oblong shape for substantially filling said oblong enclosure to substantially prevent lateral tilting of the deck with respect to the propelling vehicle, or bushings having a generally circular configuration for allowing the bushings to drift within their respective oblong enclosure so that the deck can laterally tilt with respect to the propelling vehicle to adjust to undulations in the surface being mowed, wherein said oblong bushings and said generally circular bushings are interchangeable.

7. A hitching arrangement for attaching a mower deck to a propelling vehicle, the hitching arrangement utilizing the cutting height adjustment mechanism of the mower deck to facilitate the hitching operations, the hitching arrangement comprising:

a lift shaft rotatably supported by the mower deck and extending transversely across the deck;

at least one hitch arm fixedly secured on one end to said lift shaft, said hitch arm having a hook located on its other end, said hook having a downwardly facing opening adapted for engagement with a generally horizontally disposed attaching member on the propelling vehicle;

cutting height adjustment means operably coupled to said lift shaft, for manually adjusting the cutting height of the mower deck by rotating the lift shaft to swing the lift arm, said adjustment means having a first position corresponding to an elevated cutting position for the deck and a second position corresponding to a lowered cutting position for the deck; and a deck stand releasably attached to said mower deck for supporting the latter at a predetermined height;

wherein movement of said adjustment means toward said second position with said stand attached to the deck causes said hitch arm to be swung upwardly to disengage the hook from the attaching member, and movement of said adjustment means toward said first position causes said hitch arm to be swung downwardly for engaging said hook with the attaching member;

wherein said hook of said hitch arm has latch pin means carried thereby for securing said hook to the attaching member, said attaching member including a bushing adapted to be engaged by the hook, said latch pin means having an open position and a closed position, said open position allowing said opening of said hook to receive the attaching bushing and said closed position securing the attaching bushing within said opening of said hook; and wherein said opening of said hook and said latch pin means form an oblong enclosure when said latch pin means is in its closed position and wherein the attaching member includes a generally circular shaped bushing adapted to be engaged by the hook so that, when the bushing is received in said opening and said latch means is in its closed position, the generally circular shaped bushing is allowed to drift within the oblong enclosure so that the deck can laterally adjust to undulations in the surface being mowed.

* * * * *